(12) United States Patent
Mandel et al.

(10) Patent No.: US 8,659,785 B2
(45) Date of Patent: *Feb. 25, 2014

(54) METHODS AND SYSTEMS FOR CREATING STRUCTURAL DOCUMENTS HAVING BACKGROUND CONTENT

(75) Inventors: Barry Paul Mandel, Fairport, NY (US); Jean Pierre R. M. Van de Capelle, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 209 days.

This patent is subject to a terminal disclaimer.

(21) Appl. No.: 13/294,632

(22) Filed: Nov. 11, 2011

(65) Prior Publication Data

US 2013/0120770 A1    May 16, 2013

(51) Int. Cl.
*G06K 15/00* (2006.01)
*G06F 3/12* (2006.01)

(52) U.S. Cl.
USPC .......................................... 358/1.18; 358/1.15

(58) Field of Classification Search
None
See application file for complete search history.

(56) References Cited

U.S. PATENT DOCUMENTS

| | | | |
|---|---|---|---|
| 7,788,883 B2 | 9/2010 | Buckley et al. | |
| 7,983,792 B2 | 7/2011 | Gombert et al. | |
| 2008/0225334 A1 | 9/2008 | Hamada et al. | |
| 2009/0024490 A1 | 1/2009 | Satterfield | |
| 2009/0279110 A1 | 11/2009 | Ito | |
| 2009/0282782 A1 | 11/2009 | Walker et al. | |
| 2009/0287632 A1 | 11/2009 | Gombert et al. | |
| 2010/0058943 A1 | 3/2010 | Bober | |
| 2010/0110479 A1 | 5/2010 | Gombert et al. | |
| 2010/0222908 A1 | 9/2010 | Gombert et al. | |
| 2010/0231956 A1 | 9/2010 | Liu et al. | |
| 2011/0054849 A1 | 3/2011 | Walker et al. | |
| 2011/0149337 A1 | 6/2011 | Goetz et al. | |
| 2012/0015789 A1 | 1/2012 | Harrington | |
| 2013/0120767 A1* | 5/2013 | Mandel et al. | 358/1.6 |

FOREIGN PATENT DOCUMENTS

| | | |
|---|---|---|
| EP | 1557795 A2 | 7/2005 |
| EP | 1847396 A1 | 10/2007 |
| JP | 2009226716 A | 10/2009 |

* cited by examiner

*Primary Examiner* — Dov Popovici
(74) *Attorney, Agent, or Firm* — Fox Rothschild LLP (57) ABSTRACT

A method of generating a structural document may include causing, by a cloud system, a graphical representation of a structural document associated with a structural document kit to be displayed on a user computing device. The cloud system may be located remotely from the user computing device. The graphical representation may include a background content item and a customizable area. The method may include receiving a selection of a content item, determining a position of the selected content item within the customizable area, and transmitting the selected content item to the user computing device. The user computing device may be configured to transmit the selected content item to a print device. The print device may be configured to print the selected content item on a label of the structural document kit. The label may be configured to be affixed to the structural document.

24 Claims, 9 Drawing Sheets

METHODS AND SYSTEMS FOR CREATING STRUCTURAL DOCUMENTS HAVING BACKGROUND CONTENT

CROSS REFERENCE TO RELATED APPLICATIONS

This application is related to U.S. patent application Ser. No. 13/294,488 filed Nov. 11, 2011.

BACKGROUND

Creating customizable structural documents or other items using large commercial printers is often inefficient for short runs due to labor, set-up time and overhead costs.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In an embodiment, a method of generating a structural document may include causing, by a cloud system, a graphical representation of a structural document associated with a structural document kit to be displayed on a user computing device. The cloud system may be located remotely from the user computing device. The graphical representation may include a background content item and a customizable area. The method may include receiving, from the user computing device, a selection of a content item, determining, by the cloud system, a position of the selected content item within the customizable area, and transmitting the selected content item to the user computing device. The user computing device may be configured to transmit the selected content item to a print device. The print device may be configured to print the selected content item on a label of the structural document kit. The label may be configured to be affixed to the structural document. A location of the selected content item on the label may correspond to the determined position.

In an embodiment, a system for generating a structural document may include a computing device and a computer-readable storage medium in operable communication with the computing device. The computer-readable storage medium may include one or more programming instructions for causing a graphical representation of a structural document associated with a structural document kit to be displayed on a user computing device. The graphical representation may include a background content item and a customizable area. The method may include receiving, from the user computing device, a selection of a content item, determining a position of the selected content item within the customizable area, and transmitting the selected content item to the user computing device. The user computing device may be configured to transmit the selected content item to a print device. The print device may be configured to print the selected content item on a label of the structural document kit. The label may be configured to be affixed to the structural document. A location of the selected content item on the label may correspond to the determined position.

A method of generating a structural document may include causing, by a computing device, a graphical representation of a structural document associated with a structural document kit to be displayed. The graphical representation may include a background content item and a customizable area. The method may include receiving, by the computing device, a selection of one or more content items associated with the customizable area, determining a position of the selected content item within the customizable area, and causing a print device to print the one or more selected content items on one or more labels associated with the structural document kit. A location of the selected content item on the label may correspond to the determined position.

DETAILED DESCRIPTION

The following terms shall have, for purposes of this application, the respective meanings set forth below:

A "cloud system" refers to one or more physical and/or logical devices that operate as a shared resource for multiple remote print devices and/or computing devices. Logical devices in a cloud system may be accessed without any knowledge of the corresponding physical devices.

A "content item" is a picture, a graphic, text and/or any other image.

A "firewall" is hardware and/or software used to protect a resource of one network from unauthorized external access.

A "kit" or "structural document kit" is a set of items that can be used to create a structural document. For example, a structural document kit for a megaphone may include one or more structural media portions that when assembled form a megaphone, one or more labels associated with one or more structural media portions and one or more instructions regarding how to customize the megaphone.

A "logical device" is a representation of a physical device that uniquely identifies the corresponding physical device. For example, a network interface may be assigned a unique media access control address that is the logical unique identifier of a physical device. As such, a conventional device is a combined logical and physical device in which the logical device provides the entire identity of the physical device.

A "physical device" is a physical resource such as a computing device, a computer-readable storage medium and/or the like.

A "print device" refers to a device capable of performing one or more functions, operations and/or services on a print job. For example, a print device may provide print-related services for one or more print jobs. A print device may include a printer, multi-function device or other similar equipment that is capable of printing an image on a label.

The term "remote," as used herein with respect to computing devices and/or printing devices, refers to devices that operate on different computer networks and/or computer networks operated by different entities. For example, a computing device is remote from a printing device if the computing device is connected to a first LAN operated by a first entity and the printing device is connected to a second LAN operated by a second entity.

A "remote location" is a location physically and/or geographically distant from the location of a computing device. For example, if a computing device associated with a user is a home desktop computer, a remote location may be one that is geographically distance from the user's home.

A "resource" is a physical device comprising a processor and/or a storage medium. Examples of resources may include a computing device, a processing device, a storage device and/or the like.

A "shared resource" is a resource that may be accessed and used by a plurality of other resources.

A "structural document" is an item made of, for example and without limitation, paper, cardboard, or other material which, for example and without limitation, printed material, cut lines and/or score lines may be applied. A structural document may be constructed by folding or otherwise manipulating a physical medium or physical media to provide three-dimensional features or to produce a three-dimensional package. Examples of structural documents may include gift boxes, gift bags, photo cubes, megaphones and/or the like.

A "structural media portion" a medium or media that forms a portion of a structural document. For example, a structural media portion of a megaphone structural document kit may be heavy weight paper, cardboard and/or the like that can be formatted in such a way that it may be folded to form a megaphone. A structural media portion may include cuts, score marks and/or other types of perforations along which the structural media portion may be folded, trimmed and/or the like.

"Virtualization" is a configuration that allows logical devices to exist as an abstraction without being directly tied to a specific physical device. Virtualization may be achieved using logical names instead of physical identifiers. For example, using a uniform resource locator instead of a server's media access control address effectively virtualizes the target server. Alternatively, an assigned media access control address may exist independently of the physical resources managing network traffic.

Figure 1A:
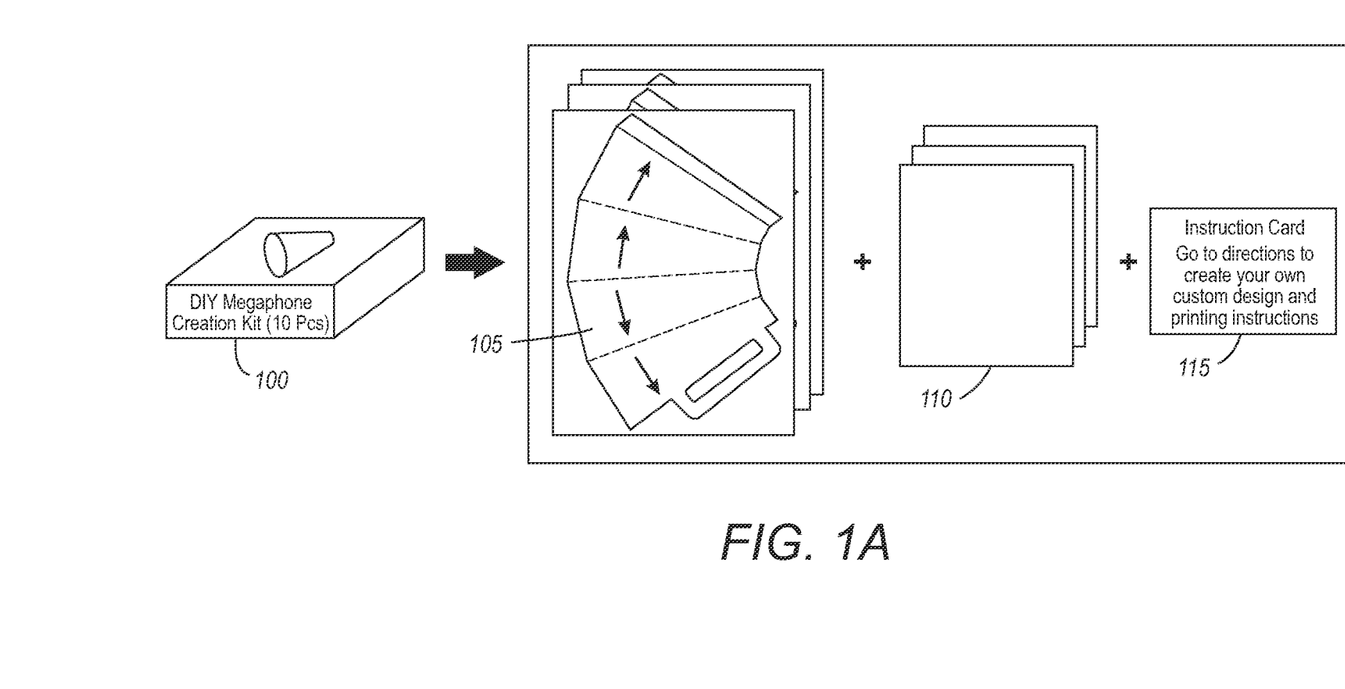
FIG. 1A illustrates an example of a kit according to an embodiment.

In an embodiment, a kit may be used to create a structural document. A kit may include one or more structural media portions, one or more labels and/or one or more instructions. FIG. 1A illustrates a kit 100 according to an embodiment. As illustrated, the kit 100 may be one for constructing a megaphone, and may include one or more pre-cut structural media portions 105, one or more labels 110 and an instruction card 115. Alternate structural document kits may also be used within the scope of this disclosure.

In an embodiment, the structural media portions may be pre-cut to a certain dimension. One or more of the structural media portions may be blank. In an alternate embodiment, one or more of the structural media portions may have graphics, text or other images printed on the portion. In an embodiment, one or more structural media portions may be formed from heavy weight media. For example, one or more structural media portions may be formed from media having a weight of at least 180 grams per square meter.

In an embodiment, the one or more labels may be pre-cut to be attached to one or more structural media portions. In an embodiment, a label may have a shape that corresponds to at least one structural media portion. For example, a label that has a square shape may correspond to a structural media portion that has a similar shape. In an embodiment, a shape of a label and a shape of its corresponding structural media portion may be identical. For example, a label that has a triangle shape may correspond to a structural media portion that has a triangle shape. Additional and/or alternate shapes may be used within the scope of this disclosure.

Figure 1B:
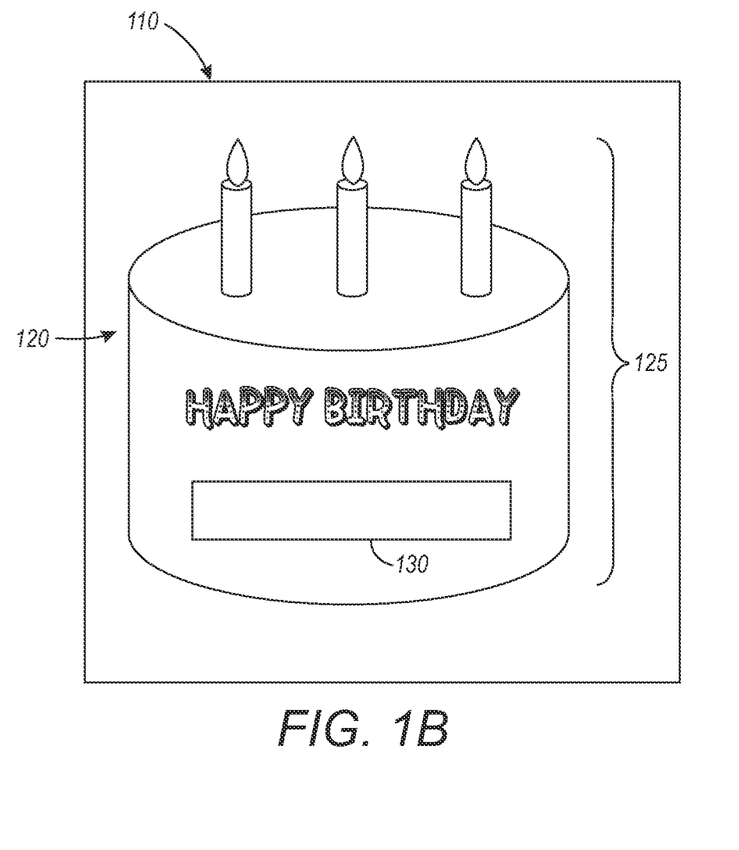
FIG. 1B illustrates an example of a label according to an embodiment.

In an embodiment, one or more labels may have a front portion and a back portion. One or more content items may be printed on the front portion of a label when processed by a print device. In an embodiment, portions of a content item may be printed on a plurality of labels. In an embodiment, the front portion of one or more labels may be blank. Alternatively, the front portion of one or more labels may include one or more content items. For example, a front portion of a label may include one or more background content items. The background content items may be pre-printed on the label. In an embodiment, a label may have one or more customizable areas. A customizable area may be a portion of label that a user may customize. For example, a user may select one or more content items to be positioned in at least a portion of the customizable area. FIG. 1B illustrates a front portion 120 of a label 110 having background content items 125 and a customizable area 130. As illustrated by FIG. 1B, a user may customize a customizable area 130 by adding one or more content items, such as a name, nickname or other content item. Additional and/or alternate background content items and/or customizable areas may be used within the scope of this disclosure.

In an embodiment, the back portion of a label may have an adhesive layer. The adhesive layer may help affix the label to a structural media portion. In an embodiment, the one or more labels may be provided on sheets.

In an embodiment, the one or more instructions may include written instructions on a piece of paper, a card, a booklet and/or the like. The instructions may direct a user to a software application that the user may use to create a structural document. In an embodiment, a kit may include a computer-readable storage medium that includes the software application. For example, a kit may include a CD-ROM on which the software application is stored. In an embodiment, the instructions may explain to a user how to install and use the computer-readable storage medium.

In an alternate embodiment, the instructions may direct a user to a web-based software application. For example, the instructions may identify a Uniform Resource Locator (URL) that the user can visit to access a software application. In an embodiment, the provided URL may be specific to the type of structural document. For example, a structural kit for creating a megaphone may include a different URL than a structural kit for creating a gift bag. In an embodiment, each structural document kit may include a unique URL.

In an embodiment, the instructions may include an access code that enables the user to access a software application via a URL. An access code may be an alpha-numerical code, password and/or other identifier associated with the kit. In an embodiment, an access code may be unique to a user. For example, an access code may limit access to a software application to a single user.

In an embodiment, an access code may be associated with a structural document. For example, kits for creating megaphones may be associated with one access code while kits for creating gift bags may be associated with a different access code. In an embodiment, each kit may be associated with a unique access code.

In an embodiment, an access code may expire. In an embodiment, after an access code expires, the access code cannot be used to access a software application. In an embodiment, an access code may expire after a period of time. For example, an access code may expire after a period of time after first being used. For instance, an access code may expire one year after the access code is first used. Additional and/or alternate periods of time may be used within the scope of this disclosure. In an embodiment, a user may use the access code to access a software application an unlimited number of times until the access code expires.

In an embodiment, an access code may expire after it is used a certain number of times. For example, an access code may be used to access a software application a maximum of ten times. When the access code is used for the tenth time, the access code may expire and may no longer be used to access a software application. Additional and/or alternate maximum access times may be used within the scope of this disclosure.

Figure 2:
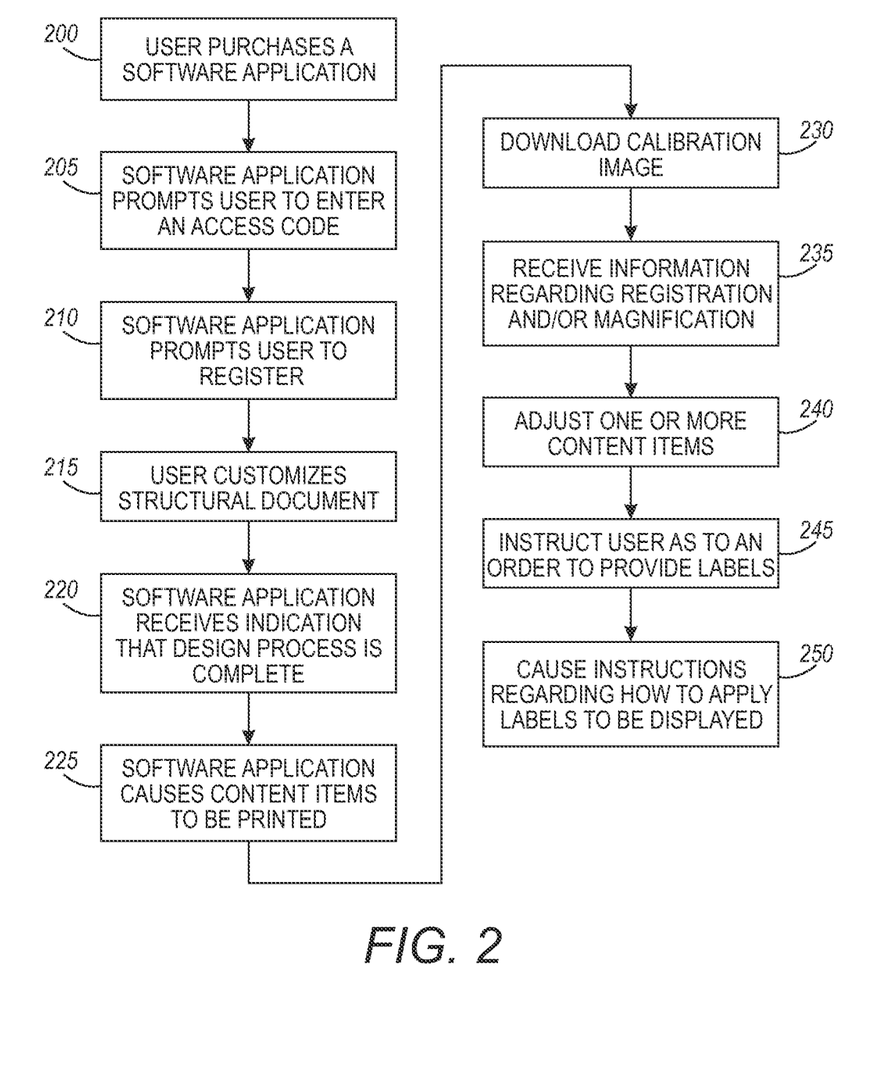
FIG. 2 illustrates an example of a method of creating a structural document according to an embodiment.

FIG. 2 illustrates a method of creating a structural document according to an embodiment. As illustrated by FIG. 2, a user may purchase 200 a structural document kit. The structural document kit may include one or more structural media portions, one or more labels, one or more instructions, an access code, a URL, a computer-readable storage medium that includes one or more software applications and/or the like.

In an embodiment, a user may access 205 a software application using the instructions provided in a kit. For example, if a kit includes a software application on a computer-readable storage medium, the user may install the software on a user computing device from the computer-readable storage medium.

In an embodiment, a software application may be hosted on a host computing device. In an embodiment, the host computing device may be located remotely from a user's computing device. In an alternate embodiment, a host computing device and a user computing device may be the same device. The host computing device may be a web server or other type of computing and/or processing device. In an embodiment, a user may access the software application from the user computing device using a web browser. For example, the instructions in a kit may direct a user to a URL address. The user may enter the URL address in a web browser on the user computing device to access the software application. In an embodiment, the user may also be required to enter an access code from a structural document kit to access the software application.

Figure 3A:
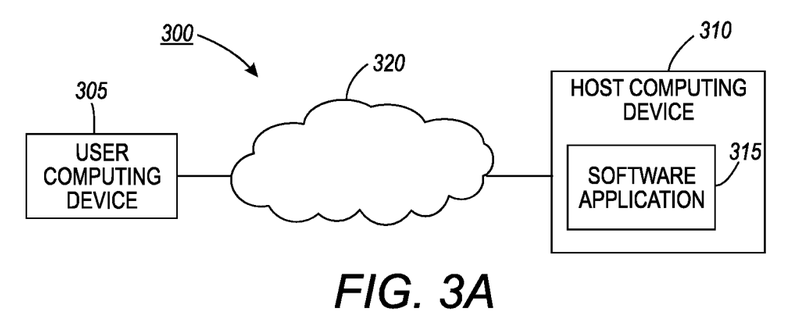
FIG. 3A illustrates an example of a system for creating a structural document according to an embodiment.

FIG. 3A illustrates a system for creating a structural document according to an embodiment. As illustrated by FIG. 3A, the system 300 may include a user computing device 305, a host computing device 310, a software application 315 located on the web server, a network 320 and a print device 340a-N. A user computing device 305 may be an electronic device having a processor and a processor readable storage medium. User computing devices 305 may include, without limitation, computers, mobile communication devices, and/or the like. In an embodiment, the user computing device 305 and/or the print device 340a-N may be in communication with the host computing device 310 via a network 320. For example, a user computing device 305 may communicate with a host computing device 310 via a wireless connection to a router that is connected to the Internet.

Figure 3B:
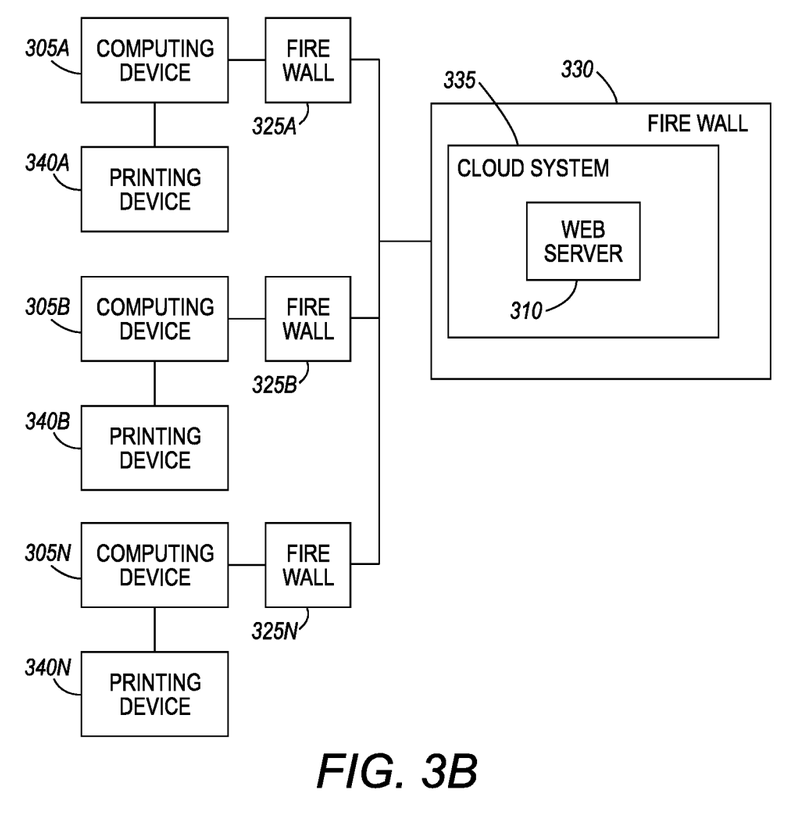
FIG. 3B illustrates an example of a system for creating a structural document according to an embodiment.

In an embodiment, the host computing device 310 may be part of a cloud system 335 as illustrated by FIG. 3B. The cloud system may be a shared resource, and may be in communication with a plurality of user computing devices 305a-N as illustrated in FIG. 3B. In an embodiment, each of the user computing devices 305a-N may be remote from each of the other user computing devices and the cloud system 335. In an embodiment, each of the user computing devices 305a-N may not communicate directly with the other user computing devices. In an embodiment, a user computing device 305a-N may communicate with the host computing device 310 through multiple firewalls. For example, referring to FIG. 3B, a communication from a user computing device 305a-N to the host computing device 310 may pass through a firewall 325a-N associated with the user computing device and a firewall 330 associated with the cloud system 335.

In an embodiment, a print device 340a-N may communicate directly with a user computing device 305a-N. For example, a user computing device 305a-N may be a home desktop computer, and a print device 340a-N may be a home printer. In an embodiment, a print device 340 may be remote from one or more user computing devices 305a-N, other print devices and/or the cloud system 335.

In an embodiment, a host computing device may prompt 210 a user to enter an access code provided in the instructions. In an embodiment, the access code may identify the type of structural document the user wants to create. In an embodiment, the access code may identify the theme of the structural document the user wants to create. In an embodiment, the host computing device may validate the access code.

In an embodiment, a host computing device may prompt 215 a user to register with the software application by creating a user account and/or providing identifying information such as name, address, email address, zip code, phone number and/or the like. In an embodiment, a user may access a host computing device as a guest user without creating a user account.

Figure 4A:
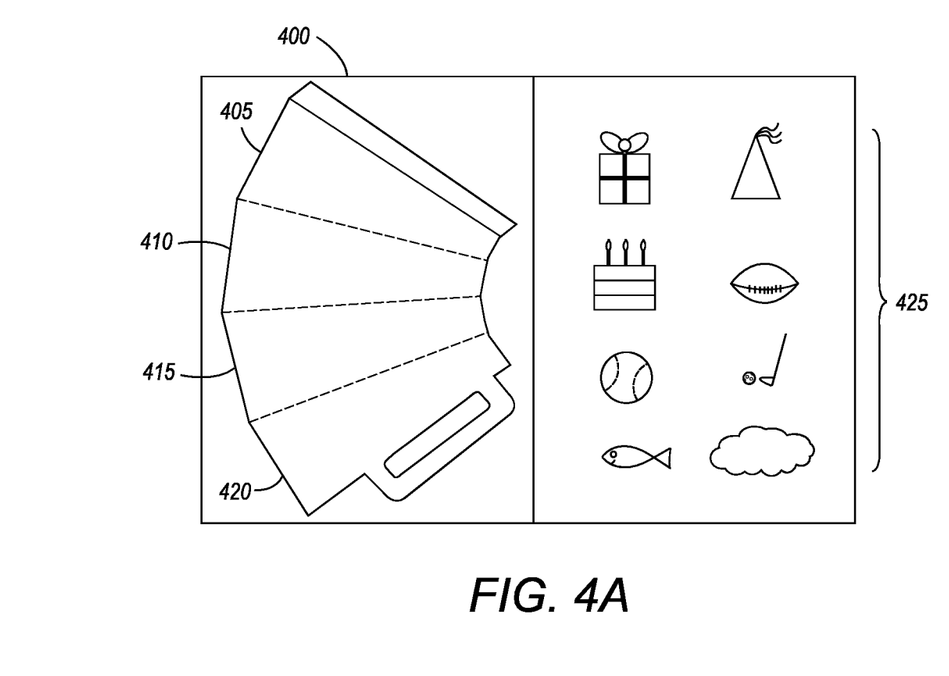
FIGS. 4A and 4B illustrate a graphical user interface of a software application that displays a graphical representation of portions of a structural document according to an embodiment.

In an embodiment, a user may be able to access a host computing device to customize 220 a structural document. In an embodiment, a host computing device may cause a graphical representation of one or more portions of a structural document to be displayed to the user. In an embodiment, a host computing device may cause a graphical representation of one or more portions of a structural document to be displayed to the user in response to validating an access code. FIG. 4A illustrates a graphical representation of portions 405, 410, 415, 420 of a megaphone structural document 400 that a host computing device may cause to be displayed to a user.

In an embodiment, a portion of a structural document may include one or more background content items and/or one or more customizable areas. In an embodiment, a graphical representation of such a portion may be displayed along with the one or more background content items and/or the one or more customizable areas. In an embodiment, one or more of the background content items may not be able to be modified by a user.

In an embodiment, a content item may be selected by a user. In an embodiment, the content items that are displayed to a user for selection by the user may be associated with an access code provided by a user. For example, if an access code provided by a user is associated with a theme, the content items that are displayed may correspond to the theme. For instance, if a user enters an access code associated with a birthday theme, content items such as images of a birthday cake, candles and a present may be displayed.

FIG. 4A illustrates examples of graphics 425 that a host computing device may cause to be displayed to a user according to an embodiment. The host computing device may enable a user to select one or more content items to include on one or more portions of a structural document. In an embodiment, a host computing device may determine a position of a selected content item on a portion of a graphical representation of a structural document. For example, a user may select a portion of a structural document and may select a content item to include on that portion. In an embodiment, a user may select a content item and may drag and drop the selected content item to a particular location on the graphical representation of the portion.

In an embodiment, a user may select one or more content items to be positioned in one or more customizable areas of the graphical representation of the portion. For example, a user may select a content item and may select a customizable area. This may cause the content item to be associated with the customizable area. In an embodiment, the selected content item may be displayed within the customizable area on the graphical representation. In an embodiment, the user may be allowed to change the position of the content item within the customizable area. For example, a user may shift a position of a content item within the customizable area. As another example, a user may enlarge, shrink or otherwise change the size of the selected content item within the customizable area.

In an embodiment, a selected content item may be automatically associated with a customizable area of a structural document. For example, if a structural document only includes one customizable area on which a content item can be positioned, a selected content item may be associated with that customizable area. As another example, a structural document may include one or more customizable areas that are associated with a type of content item. For example, a structural document may include a customizable area associated with a text content item and a customizable area associated with a graphic content item. A selected text content item may be automatically associated with the text content item customizable area and a selected graphic content item may be associated with the graphic content item customizable area.

In an embodiment, a selection of one or more content items may be received by the host computing device. In an embodiment, the host computing device may receive one or more content items from a user computing device.

In an embodiment, a user may select a content item by selecting an image with a keyboard, a mouse and/or another pointer or input device. The user may drag and drop the selected content item on a portion of the structural document displayed using the software application. In another embodiment, a user may select a portion of a structural document by clicking on the portion of the graphical representation of the structural document.

Figure 4B:
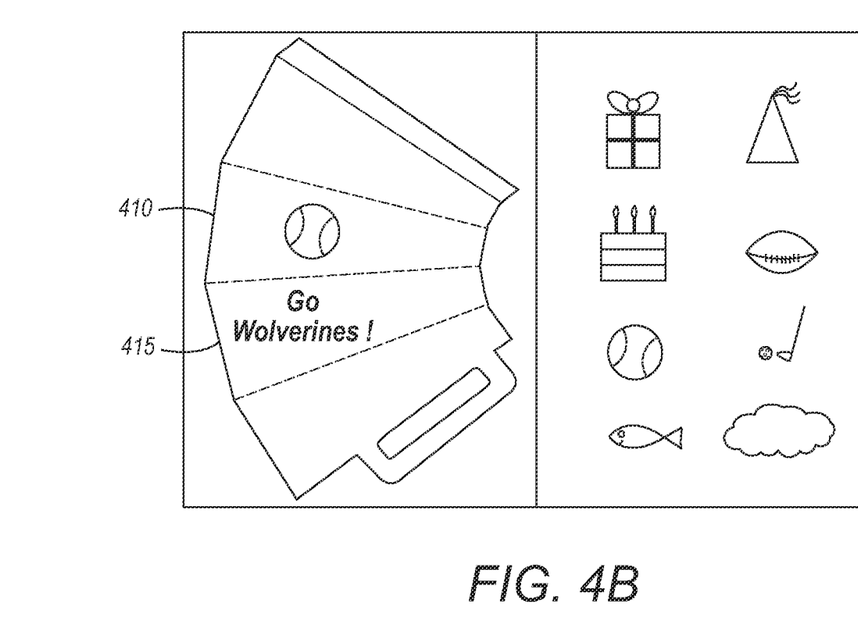

In an embodiment, the host computing device may cause the selected content item to be displayed on the selected portion of the structural document. For example, if the host computing device receives a selection of an image of a baseball to include on a portion 410 of the megaphone, the host computing device may cause the image of the baseball to be displayed on this portion as illustrated in FIG. 4B.

In an embodiment, the host computing device may enable a user to insert text into one or more portions of a structural document. For example, a user may be able to enter text into a selected portion of a structural document via a keyboard, a graphical representation of letters, a touch screen keyboard and/or the like. The entered text may be received by the host computing device. In an embodiment, the host computing device may cause the received text to be displayed on at least a portion of the graphical representation of the structural document. FIG. 4B illustrates the inclusion of the text "Go Wolverines!" on a portion 415 of the structural document.

In an embodiment, a host computing device may receive one or more content items from a user. For example, a user may provide one or more content items to include on the structural document. For example, a user may upload a picture or other image from the user's computing device, remote storage device and/or the like to the host computing device. In an embodiment, a user may import a content item to include on the structural document from another server, computing device, software application, and/or the like. For example, a user may import names from a class roster that is stored as a spreadsheet. Additional and/or alternate information and formats may be used within the scope of this disclosure.

In an embodiment, a user may edit, modify, delete and/or otherwise change the location or position of the selected content items on the graphical representation of the structural document. In an embodiment, any edits, modifications, deletions and/or other changes made by a user may be received by the host computing device. In an embodiment, when the user has finished designing the structural document, the host computing device may receive 220 an indication from the user that the design process is complete. For example, the user may select a button, icon, picture and/or the like. In an embodiment, a user may indicate that the design process is completed by requesting the structural document be printed 225.

In an embodiment, the host computing device may receive a request from a user computing device to transmit the selected content items to the user computing device. For example, when a user is ready to print the content items on one or more labels, the user may instruct the user computing device to print the selected content items. For instance, a user may select a print or other option including that the selected content items are to be printed. In an embodiment, the user computing device may send a request to the host computing device. In response to receiving a request from a user computing device, the host computing device may transmit the selected content items to the user computing device. The user computing device may cause a print device to print the selected content items.

Figure 5:
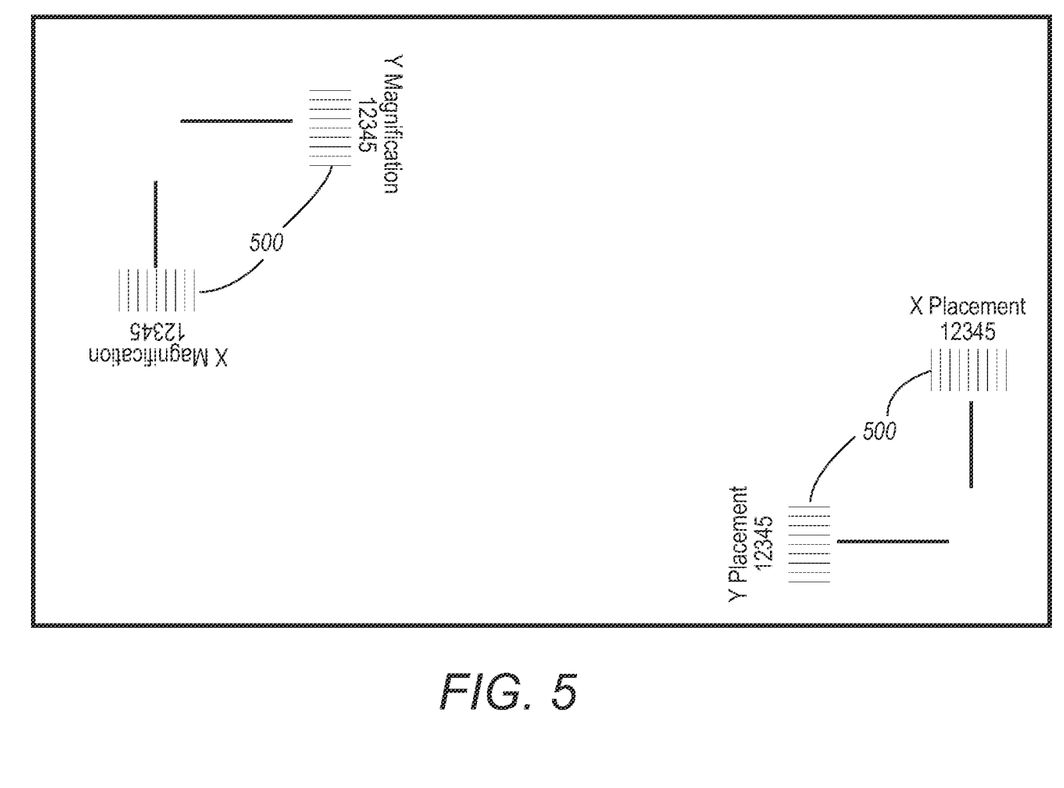
FIG. 5 illustrates an example of a calibration sheet according to an embodiment.

In an embodiment, a kit may include a calibration sheet that may be used to register images that are printed on the labels. FIG. 5 illustrates an example of calibration sheet according to an embodiment. In an embodiment, a calibration sheet may include one or more calibration reference marks. The calibration reference marks may indicate an expected location where one or more images are to be displayed. FIG. 5 illustrates examples of reference marks 500 according to an embodiment.

In an embodiment, a user may download 230 a calibration image from the host computing device to print on the calibration sheet. When the calibration Image is printed on the calibration sheet, information regarding the registration and/or magnification of the printed image relative to one or more of the reference marks may be received 235 by the host computing device. In an embodiment, the location of the calibration image relative to the marks on the calibration sheet may be observable to a user when printed. The host computing device may use this information to adjust 240 one or more content items displayed on the graphical representation of the structural document. For example, the host computing device may shift the location of one or more content items. As another example, the host computing device may adjust the magnification of one or more content items and/or impart a rotation of one or more content items. In an embodiment, adjusting one or more content items displayed on the graphical representation of the structural document may help to correctly register the content items when they are printed on the labels.

In an embodiment, the host computing device may instruct 245 the user as to an order in which to provide labels to a print device. For example, the labels may be associated with a unique identifier such as a letter, a number and/or the like. The host computing device may instruct 245 the user as to an order in which the labels are to be printed according to their unique identifiers.

In an embodiment, the host computing device may cause 250 one or more instructions regarding how to apply the labels to the structural media portions and/or how to construct a structural document from the structural media portions to be displayed to a user. For example, the instructions may instruct a user as to which label should be affixed to which portion of the structural document. In an embodiment, the labels and the portions may each be associated with a unique identifier. An example of an instruction may be to apply Label A to Portion 1.

In an embodiment, the instructions may instruct a user as to how to assemble a structural document from the structural media portions. For example, the instructions may instruct a user to fold the structural media portions in a certain manner. As another example, the instructions may instruct a user to glue, tape or otherwise secure the structural media portions in a certain manner.

Figure 6:
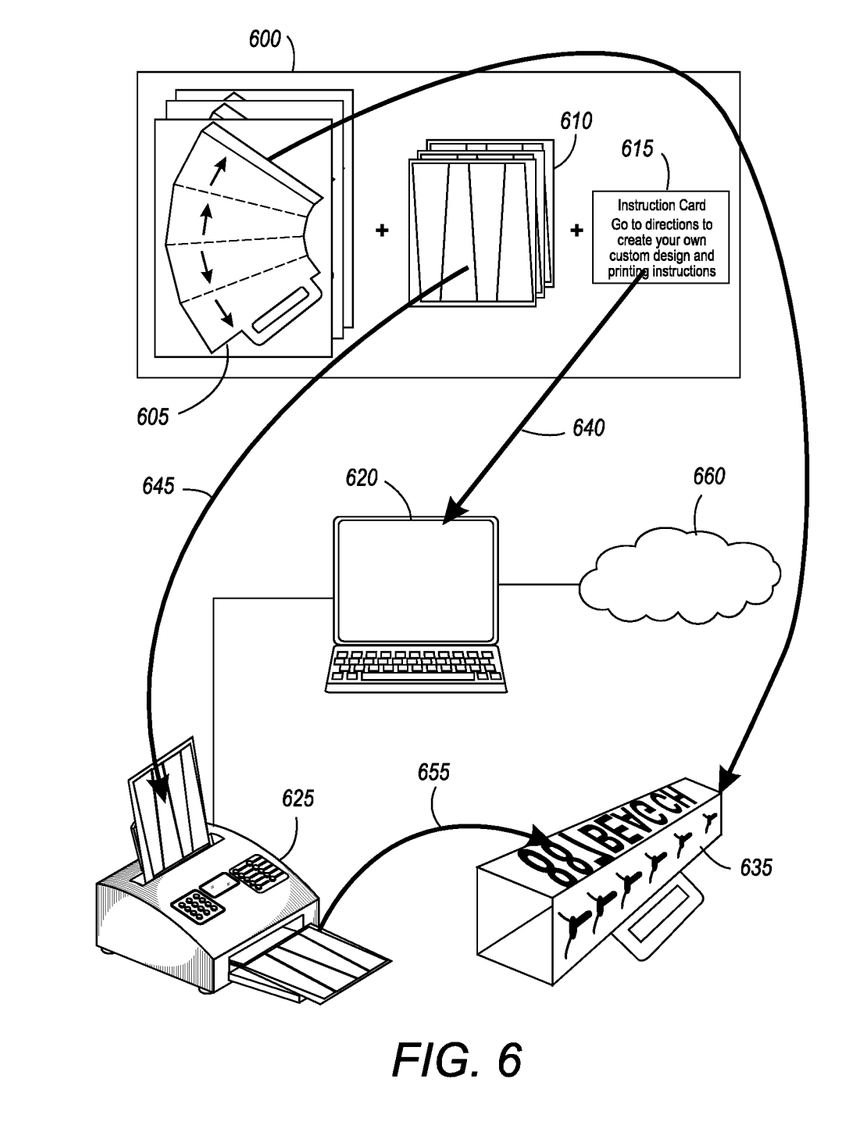
FIG. 6 illustrates an example of an implementation of creating a structural document according to an embodiment.

FIG. 6 illustrates implementation of creating a structural document according to an embodiment. As illustrated in FIG. 6, a structural document kit 600 may include one or more structural media portions 605, one or more labels 610 and one or more instructions 615. The instructions 615 may be used to access 640 a software application that resides on a cloud system 660 via a user computing device 620. A user may customize the labels using the software application, and customized content may be printed 645 on the labels 610 using a print device 625. The structural media portions 605 may be folded or otherwise manipulated to form a structural document 635, and the printed labels 610 may be applied 655 to the structural document 635.

Figure 7:
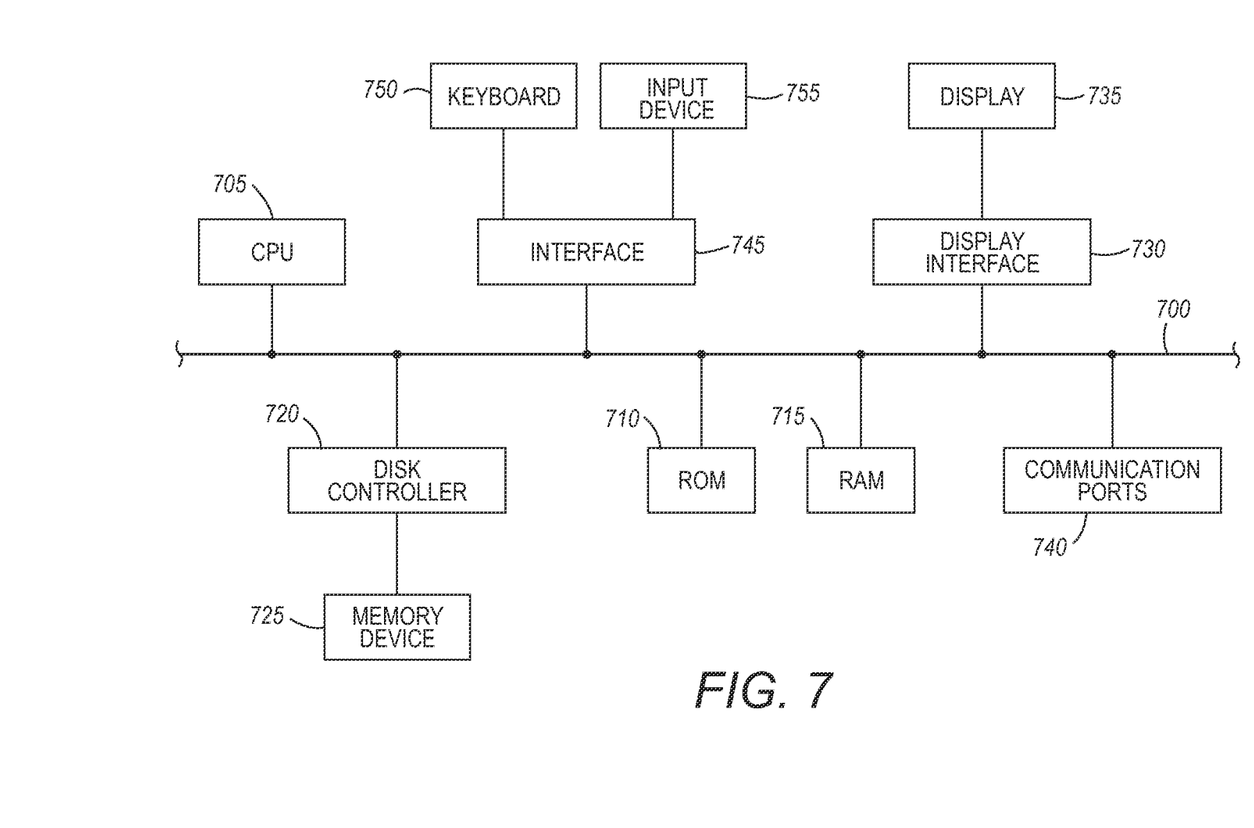
FIG. 7 illustrates a block diagram of internal hardware that may be used to contain or implement program instructions according to an embodiment.

FIG. 7 depicts a block diagram of the internal hardware that may be used to contain or implement program instructions, such as the process steps discussed above in reference to FIG. 2, according to an embodiment. A bus 700 serves as the main information highway interconnecting the other illustrated components of the hardware CPU 705 is the central processing unit of the system, performing calculations and logic operations required to execute a program, CPU 705, alone or in conjunction with one or more of the other elements disclosed in FIG. 7, is an example of a processing device, computing device or processor as such terms are used with this disclosure. Read only memory (ROM) 710 and random access memory (RAM) 715 constitutes examples of memory devices.

A controller 720 interfaces with one or more optional memory devices 725 to the system bus 700. These memory devices 725 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 730 may permit information from the bus 700 to be displayed on the display 735 in audio, visual, graphic or alphanumeric format. Communication with external devices, such as a printing device, may occur using various communication ports 740. A communication port 740 may be attached to a communications network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of generating a structural document, the method comprising:
   causing, by a cloud system, a graphical representation of the structural document associated with a structural document kit to be displayed on a user computing device, wherein the cloud system is located remotely from the user computing device, wherein the graphical representation comprises a background content item and a customizable area;
   receiving, from the user computing device, a selection of a content item;
   determining, by the cloud system, a position of the selected content item within the customizable area; and
   transmitting the selected content item to the user computing device, wherein the user computing device is configured to transmit the selected content item to a print device, wherein the print device is configured to print the selected content item on a label of the structural document kit, wherein the label is configured to be affixed to the structural document, wherein a location of the selected content item on the label corresponds to the determined position.

2. The method of claim 1, wherein causing the graphical representation to be displayed comprises causing the graphical representation of the structural document associated with the structural document kit to be displayed on the user computing device in response to validating an access code.

3. The method of claim 1, further comprising causing, by the cloud system, the selected content item to be displayed on the user computing device within the customizable area of the graphical representation.

4. The method of claim 1, wherein receiving the selection of the content item comprises:
   causing a plurality of content items to be displayed on the user computing device;

receiving the selection of the content item from the plurality of content items; and receiving a selection of the customizable area.

5. The method of claim 1, wherein receiving the selection of the content item comprises receiving the content item from the user comprising device.

6. The method of claim 1, wherein the structural document kit comprises:
one or more structural media positions;
one or more labels; and
one or more instructions comprising a URL address and an access code.

7. The method of claim 6, wherein the background content item is pre-printed on at least one of the one or more labels.

8. The method of claim 1, further comprising causing one or more instructions regarding how to apply one or more labels to one or more structural media portions in the structural document kit to be displayed on the user computing device.

9. The method of claim 1, further comprising:
causing a calibration image to be printed on a calibration sheet;
receiving information regarding one or more of a registration and a magnification of the calibration image relative to one or more reference marks on the calibration sheet; and
adjusting one or more of the registration and the magnification of the selected content item based on the received information.

10. The method of claim 9, wherein the structural document kit comprises the calibration sheet.

11. The method of claim 1, further comprising:
receiving, by the cloud system from the user computing device, an access code associated with the structural document kit; and
validating, by the cloud system, the access code.

12. The method of claim 1, wherein each label has a shape that corresponds to at least one portion of the structural document.

13. A system for generating a structural document, the system comprising:
a host computing device; and
a non-transitory computer-readable storage medium in operable communication with the host computing device, wherein the computer-readable storage medium comprises one or more programming instructions for:
causing a graphical representation of the structural document associated with a structural document kit to be displayed on a user computing device, where the graphical representation comprises a background content item and a customizable area,
receiving, from the user computing device, a selection of a content item,
determining a position of the selected content item within the customizable area, and
transmitting the selected content item to the user computing device, wherein the user computing device is configured to transmit the selected content item to a print device, where in the print device is configured to print the selected content item on a label of the structural document kit, wherein the label is configured to be affixed to the structural document, wherein a location of the selected content item on the label corresponds to the determined position.

14. The system of claim 13, wherein the computer-readable storage medium further comprises one or more programming instructions for causing the selected content item to be displayed at the user computing device on an associated portion of the graphical representation.

15. The system of claim 13, wherein the one or more programming instructions for receiving the selection of the content item comprise one or more programming instructions for:
causing a plurality of content items to be display at the user computing device; and
receiving the selection of the content item from the plurality of content items.

16. The system of claim 13, where in the one or more programming instructions for receiving the selection of the content item comprise one or more programming instructions for:
receiving one or more content items from the user computing device; and
receiving the selection of the content item from the received one or more content items from the user computing device.

17. The system of claim 13, further comprising one or more programming instructions for causing one or more instructions regarding how to apply one or more labels to one or more structural media portions in the structural document kit to be displayed at the user computing device.

18. The system of claim 13, where in the computer-readable storage medium further comprises one or more programming instructions for:
causing calibration image to be printed on a calibration sheet;
receiving information regarding one or more of a registration and a magnification of the calibration image relative to one or more reference marks on the calibration sheet; and
adjusting one or more of the registration and the magnification of the selected content item based on the received information.

19. The system of claim 13, wherein the host computing device is in communication with a plurality of remote computing devices, wherein the host computing device operates as a shared resource for the plurality of remote computing devices.

20. The system of claim 13, wherein the computer-readable storage medium further comprises one or more programming instructions for:
receiving, from the user computing device, an access code associated with the structural document kit; and
validating the access code.

21. The system of claim 13, wherein each label has a shape that corresponds to at least one portion of the structural document.

22. A method of generating a structural document, the method comprising:
causing, by a computing device, a graphical representation of the structural document associated with a structural document kit to the displayed wherein the graphical representation comprises a background content item and a customizable area;
receiving, by the computing device, a selection of one or more content items associated with the customizable area;
determining a position of the one or more selected content items within the customizable area; and
causing a print device to print the one or more selected items on one or more labels associated with the structural document kit, wherein a location of the one or more selected content items on the one or more labels corresponds to the determined position.

23. The method of claim 22, wherein a shape of each label corresponds to at least one portion of the structural document.

24. The method of claim 22, wherein receiving the selection of the one or more content items comprises:
- causing a plurality of the content items to be displayed;
- receiving a selection of a content item from the plurality of the content items; and
- receiving a selection of a portion of the graphical representation.

* * * * *